Aug. 5, 1958   G. A. LYON   2,846,269
WHEEL COVER
Original Filed Sept. 23, 1953
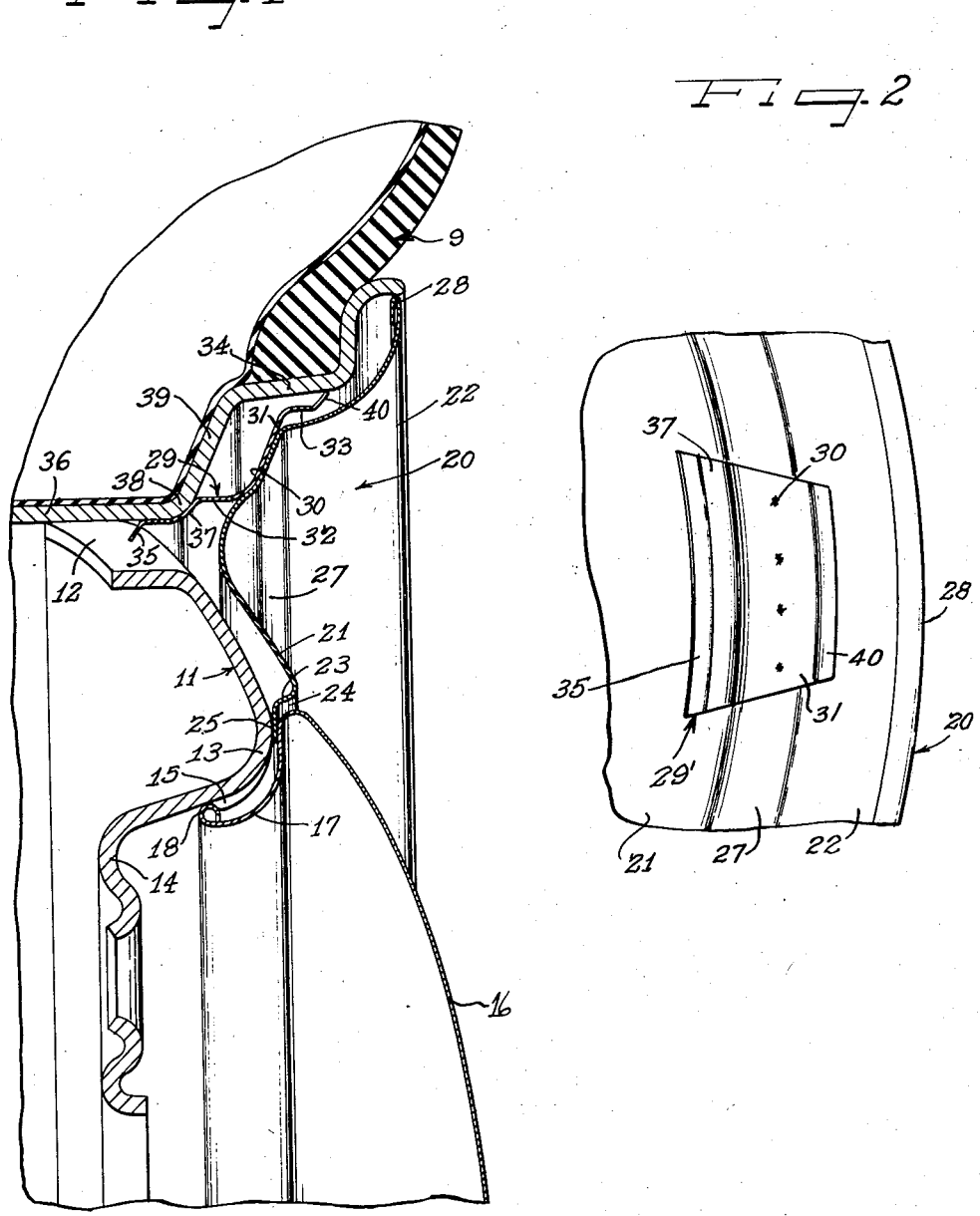
Inventor
George Albert Lyon

United States Patent Office 2,846,269
Patented Aug. 5, 1958

2,846,269

WHEEL COVER

George Albert Lyon, Detroit, Mich.

Original application September 23, 1953, Serial No. 381,793, now Patent No. 2,729,512, dated January 3, 1956. Divided and this application December 12, 1955, Serial No. 552,426

7 Claims. (Cl. 301—37)

The present invention relates to wheel structures and more particularly concerns the ornamental and protective covering of the outer sides of vehicle wheels.

The present application is a division of my copending application Serial No. 381,793 filed September 23, 1953, now Patent No. 2,729,512.

An object of the present invention is to provide a wheel structure having novel cover means for disposition at the outer side thereof and equipped with improved retaining and centering means.

Another object of this invention is to provide a detachable wheel cover which lends itself to economical manufacture from sheet metal.

Yet another object of this invention is to provide a wheel cover with retaining means which also serves as a means for centering the cover on the wheel as it is pressed home into retained position.

It is still another object of the invention to provide novel centering and retaining finger structure for wheel covers, which finger structure is especially suitable for press-on, pry-off retention with a wheel flange.

Other objects, features and advantages of the present invention will be readily apparent from the following detailed description of a preferred embodiment thereof taken in connection wtih the accompanying drawing, in which:

Figure 1 is a fragmentary substantially radial sectional detail view of a wheel structure embodying features of the invention; and Figure 2 is a fragmentary rear view of a portion of the cover showing one of the fastening elements or finger structures secured thereto.

As shown on the drawings:

My cover invention is applicable to a conventional type of automobile wheel assembly. Such an assembly includes a pneumatic tube and tire 9 mounted in the usual manner upon the steps or flanges of a multi-flanged drop center type of tire rim 10, which in turn is carried by a central wheel body part 11. The wheel body or spider part 11 comprises a dished metallic stamping fastened at spaced intervals to the base flange of the rim part 10, leaving the usual wheel openings 12 between the points of fastening.

The body part 11 also includes a bulged central nose portion 13 which terminates in an indented bolt-on flange 14, which can be secured by the customary cap screws or bolts (not shown) to a part on an automobile wheel axle.

The nose portion 13 of the body part 11 has spaced inclined hub cap retaining bumps or protuberances 15 at its inner side. Detachably cooperable with those bumps 15 is a metallic shell-like hub cap 16 having an underturned skirt 17 telescoping the nose portion 13 and terminating in a curled edge 18 adapted to be snapped over and behind the bumps 15. This hub cap may be removed by a screw-driver or other pry-off tool to afford access to the bolt-on flange 14 when it is desired to remove the wheel from the axle.

Cooperable with this wheel is a circular wheel cover 20 embracing the features of this invention. This cover is made of any suitable sheet material, such, for example, as sheet steel, brass, aluminum alloy, or the like, and includes radially inner and outer divergent portions 21 and 22. In other words, the cover 20 is of a dished cross-sectional configuration.

The inner margin of the cover is indented at 23 to provide a space 24 between the cover and the outer edge of the hub cap to permit of the introduction of the end of a pry-off tool under the edge of the hub cap in the removal of the hub cap. The dished flange 23 serves as a shoulder for the pry-off tool to engage in the ejection of the cap. In addition, if it is so desired, the inner edge of the cover 20 may be extended radially inwardly at 25 so as to underlie the edge of the cap. In this way the cover can also be clamped by the cap to the body part. In any event the flange 25 whether it extends under the cap or not should preferably bottom against the nose portion 13 of the body part so that the body part constitutes an abutment against which the cover is firmly retained.

I also preferably form the cover 20 with a turned edge marginal flange 28 spaced from the opposite flange of the rim part 10 so as to provide clearance for the accommodation of the usual wheel balancing weight (not shown) carried by the outer edge of the tire rim.

This cover of my invention is preferably made in the form of a stamping and any suitable curling tool may be employed for forming the turned outer edge of the cover. This cover may be given any desirable external finish, such, for example, as a high lustrous finish. If it is made of stainless steel, as is very commonly used in wheel covers, it may be given a high buff finish.

In order to retain this cover 20 on the wheel there is attached to the rear side of the cover portion 22 adjacent the junction of the wheel parts a plurality of spaced retaining and centering elements 29 welded at 30 to the cover. These elements may be made of spring steel and each of them is preferably made in one generally L-shaped piece and includes a generally radially outwardly projecting retaining finger 31 and a generally axially extending centering finger 32. These fingers are connected together by a body portion which is secured to the cover at the welds 30 so that the welds in reality constitute a fulcrum point for each of the fingers in the use and operation of the cover.

Each of the retaining elements 29 has the body portion thereof nested in a saddle-like cross-sectioned annular rearwardly grooved portion 27 of the intermediate dished part of the cover member 20 to thereby assist not only locating of the retaining elements 29 in assembling the same with the cover member 20 but also to provide shoulder interengagement of the retaining elements and the cover to resist transverse or radial displacement of the retaining elements relative to the cover.

It will be observed that the axially inner portion of the radially outer cover portion or section 22 is disposed to lie in radially inwardly spaced relation to a tire rim intermediate flange 34. That is, the axially inner portion of the cover part 22 is of a smaller diameter than the intermediate flange 34.

Herein each of the retaining fingers 31 extends radially outwardly to a point roughly midway between the intermediate flange 34 and the adjacent generally radially outwardly facing portion of the cover part 22 and has a retaining terminal portion 33 in the form of a generally axially outwardly extending leg providded with a short and stiff radial leg flange or extremity 40 which is provided with a tip that is engageable retainingly with the rim flange 34. By being disposed in the space between the rim flange 34 and the adjacent radially outwardly facing portion of the cover, the retaining terminal leg 33 is generally radially flexible in said space so that in applying the cover to the outer side of the wheel, the tips of the terminal extremities 40 of the retaining fingers may cam and slide generally radially inwardly and axially inwardly from a somewhat larger diameter than the diameter of the axially outer portion of the rim flange 34, axially inwardly along the rim flange with corresponding radially inward deflection of the retaining leg terminals and of the leg terminal portions 33. This develops a substantially tensioned condition in the retaining fingers 31 and more particularly the leg portions 33 thereof for thereby effecting efficient radially outward cover retaining thrust of the tips of the terminal flanges 40 against the rim flange 34.

Moreover, I have found that this angular construction of the legs 33 and the terminals 40 while affording a tight grip of the fingers is easily releasable in prying the cover from the wheel. This is accomplished by applying a pry-off tool behind the cover edge 28 and fulcruming the tool, such as a screw driver, on the outer edge of the tire rim. In response to such pry-off force the retaining finger legs 33 exert an axially outward thrust on the retaining terminals 40 and thus cause the tips thereof to slide free from the rim flange. This structure is such that any tendency of the retaining fingers of the clips 29 to turn inside-out is effectively resisted. The dished configuration of the cover both in the radially outer portion 22 thereof and in the intermediate portion 27 substantially rigidifies the cover and resists buckling or distortion of the cover under the effect of the pry-off force.

In the course of movement of the cover 20 inwardly into position on the wheel, the centering fingers 32 enter the wheel openings 12 and bear against the base flange 36 of the tire rim so as to center the cover on the wheel. In addition, axially inward stop limit is afforded by the provision on each of the fingers 32 of a generally radially outwardly and axially inwardly directed shoulder 37 arranged to engage against a juncture shoulder 38 on the tire rim where the base flange 36 thereof joins a side flange 39 of the tire rim. This holds the cover in proper plane relation to the wheel and properly spaced from the tire rim.

By the arrangement shown the dished portion of the cover extends into a position in close proximity to but in spaced relation to the junction of the wheel parts so that the cover substantially follows the contour of the flanges of the tire rim part for thereby providing a highly desirable ornamental effect.

Attention is directed to the fact that while the wheel cover is shown with a detachable center hub cap 16, the hub cap 16 could, as is well known in the art, also be made integral with the cover inasmuch as the retaining fingers are sufficiently strong to hold the cover on the wheel regardless of whether it be in the form of an annulus or full disk.

It will be understood that modifications and variations may be effected without departing from the scope of the novel concepts of the present invention.

I claim as my invention:

1. In a wheel structure including a wheel having multi-flanged tire rim and body parts with spaced wheel openings adjacent their junction, a circular wheel cover for disposition on said wheel over the junction of said parts and means for centering and retaining said cover on the wheel comprising a plurality of elements fastened at spaced points to the back side of the cover, each element including a finger for retainingly gripping a flange of the rim part and each element having another finger positioned to extend into a wheel opening to engage a wheel part therein for centering the cover on the wheel, each of said gripping fingers having an angled extremity including an axially extending leg and a generally radially extending short leg terminating in a flange gripping extremity.

2. In a wheel structure including a wheel body and a tire rim, a cover for the outer side of the wheel having a margin disposed adjacent to the tire rim, said margin having therebehind a set of retaining clips, said clips supporting the cover in spaced relation to the wheel and having first legs with retaining tips engaging a generally axially extending flange of the tire rim and second legs with shoulders bottoming against a generally radially extending flange of the tire rim, said retaining tips extending generally radially outwardly from generally axially outwardly extending intermediate portions of said first legs.

3. A cover for disposition at the outer side of a vehicle wheel, a margin on the cover adapted to lie opposite a tire rim, said margin having therebehind a series of retaining spring clips having generally radially outwardly projecting retaining terminals, and generally axially inwardly projecting legs having portions intermediate the extremities thereof affording shoulders for engagement with one part of a tire rim while the retaining terminals engage another part of the tire rim, said retaining terminals being disposed on generally axially outwardly extending leg portions of said spring clips.

4. In a wheel structure including a multi-flanged tire rim and a wheel body, a cover for disposition at the outer side of the wheel including an annular dished portion to lie in assembly with the wheel in adjacent spaced relation to the juncture of the rim and wheel body, said annular portion having an annular shoulder groove therein, and a series of retaining clip members having intermediate body portions nested in said groove and thereby uniformly located with respect to said annular portion, said clips having generally radially outwardly projecting retaining legs diverging from the cover for engagement with the tire rim and additional legs diverging from the cover and extending generally axially inwardly for centering engagement with the wheel.

5. In a wheel structure including a multi-flanged tire rim and a wheel body, a cover for disposition at the outer side of the wheel including an annular dished portion to lie in assembly with the wheel in adjacent spaced relation to the juncture of the rim and wheel body, said annular portion having an annular shoulder groove therein, and a series of retaining clip members having intermediate body portions nested in said groove and thereby uniformly located with respect to said annular portion, said clips having generally radially outwardly projecting retaining legs for engagement with the tire rim, said retaining legs including generally axially outwardly extending angular terminal portions provided with short and stiff radially outwardly extending tire rim flange gripping extremity portions.

6. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and merging with an annular generally axially inwardly facing tire rim side flange confronting portion, said tire rim confronting portion having attached to the axially inwardly facing surface thereof a circumferentially spaced series of retaining clips having resilient retaining fingers extending generally radially outwardly and provided with generally axially outwardly extending resilient retaining finger legs spaced radially outwardly from said first mentioned cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said legs resisting buckling thereof in response to pry-off force and thus effecting axially outward thrust upon said tips during pry-off to cause the tips to slide free from said engageable portion of the intermediate flange.

7. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and merging with an annular generally axially inwardly facing tire rim side flange confronting portion, said tire rim confronting portion having attached to the axially inwardly facing surface thereof a circumferentially spaced series of retaining clips having resilient retaining fingers extending generally radially outwardly and provided with generally axially outwardly extending resilient retaining finger legs spaced radially outwardly from said first mentioned cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said legs resisting buckling thereof in response to pry-off force and thus effecting axially outward thrust upon said tips during pry-off to cause the tips to slide free from said engageable portion of the intermediate flange, said clips being secured to said axially inwardly facing surface by welding.

References Cited in the file of this patent

UNITED STATES PATENTS

| | | |
|---|---|---|
| 2,193,104 | Lyon | Mar. 12, 1940 |
| 2,368,230 | Lyon | Jan. 30, 1945 |
| 2,368,235 | Lyon | Jan. 30, 1945 |
| 2,411,164 | Lyon | Nov. 19, 1946 |